March 21, 1967  O. H. RAMO  3,310,244

LOAD CELL FOR CRUSHING ROLLS

Original Filed Aug. 14, 1962  4 Sheets-Sheet 1

INVENTOR.
OLIVER H. RAMO
BY
Dike, Thompson, Bronstein & Mrose
ATTORNEYS

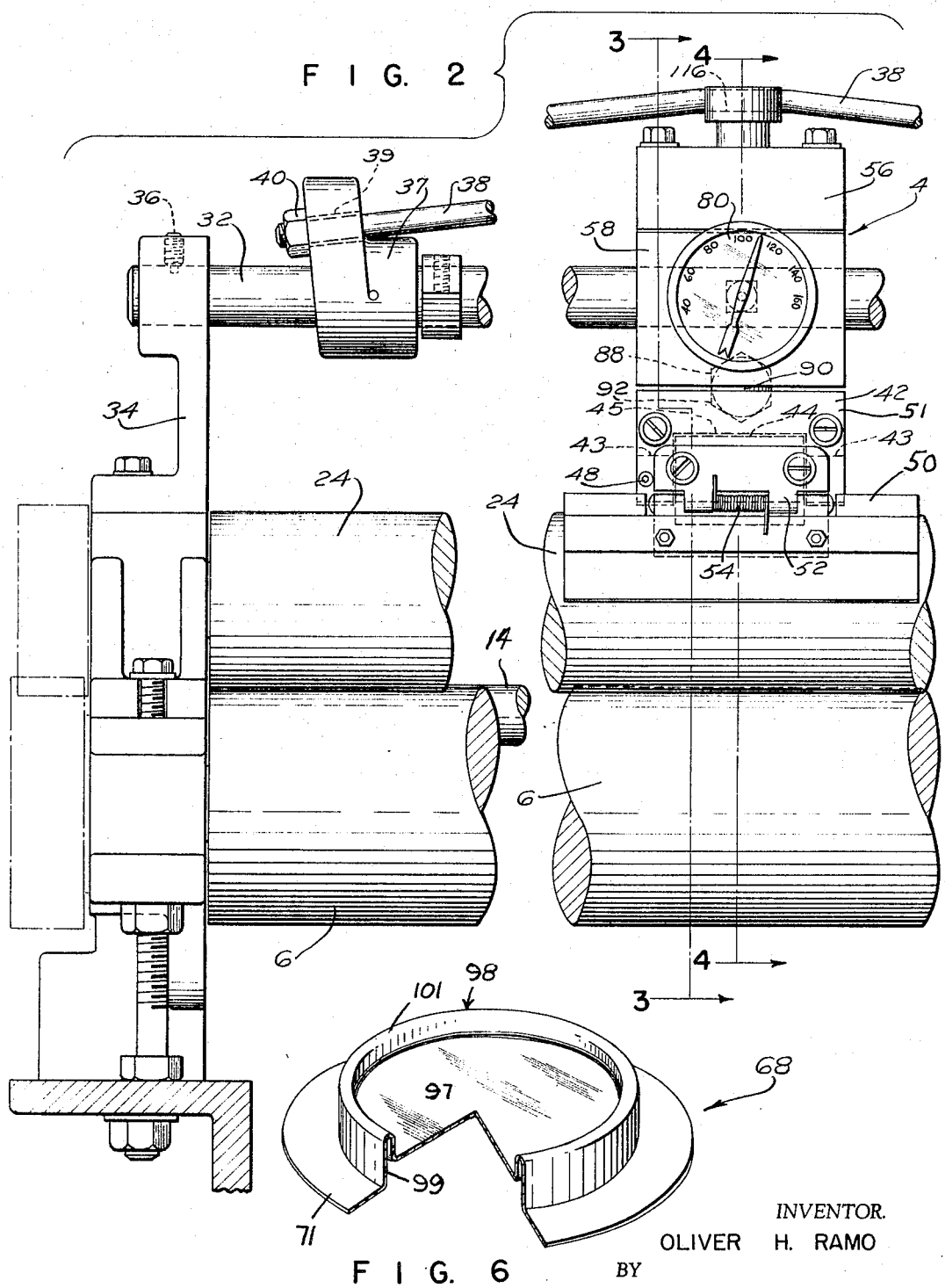

March 21, 1967  O. H. RAMO  3,310,244
LOAD CELL FOR CRUSHING ROLLS
Original Filed Aug. 14, 1962  4 Sheets-Sheet 3
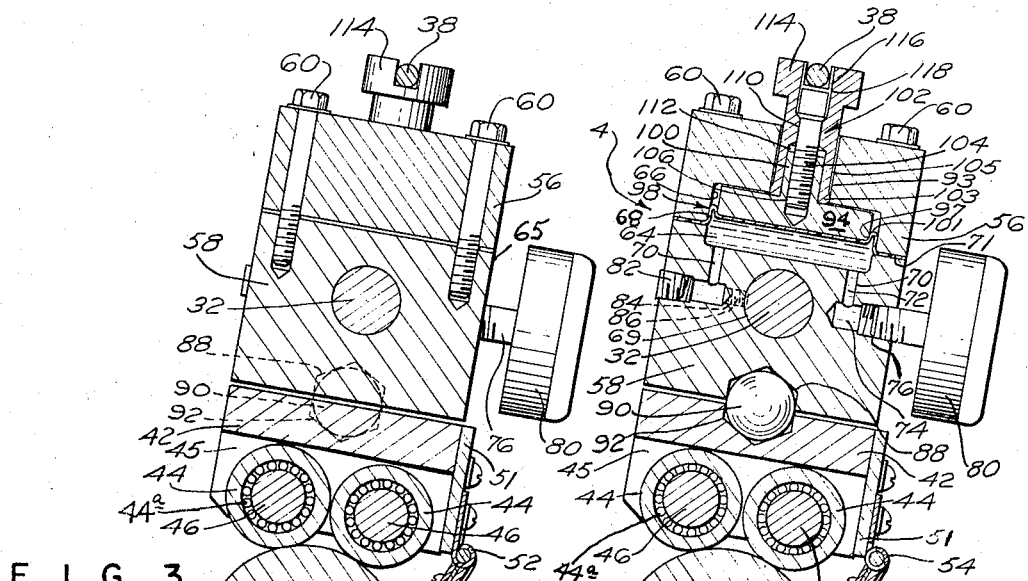
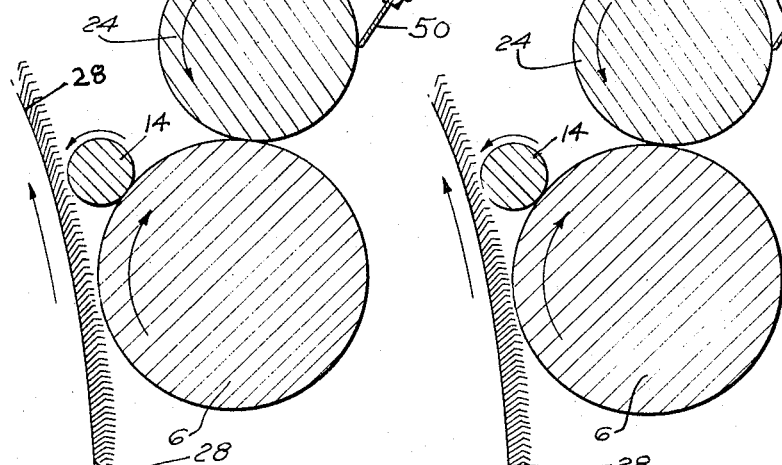
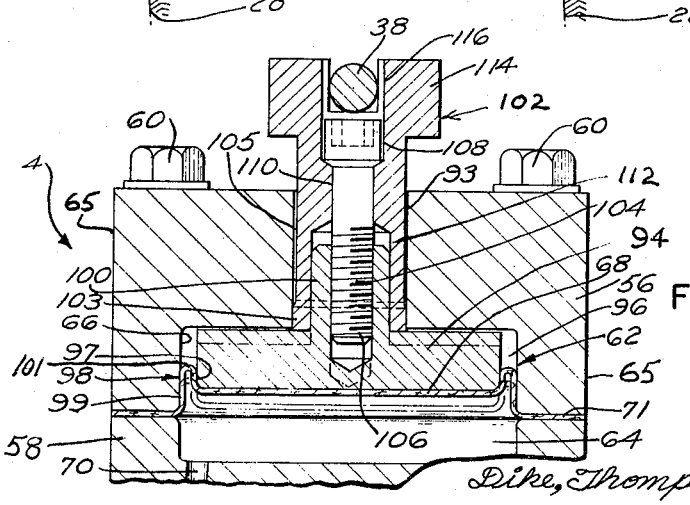
INVENTOR.
OLIVER H. RAMO
BY
Dike, Thompson, Bronstein & Mrose
ATTORNEYS March 21, 1967     O. H. RAMO     3,310,244
LOAD CELL FOR CRUSHING ROLLS
Original Filed Aug. 14, 1962     4 Sheets-Sheet 4

INVENTOR.
OLIVER H. RAMO
BY
*Dike, Thompson, Bronstein & Mosk*
ATTORNEYS 3,310,244
LOAD CELL FOR CRUSHING ROLLS
Oliver H. Ramo, North Abington, Mass., assignor to Abington Textile Machinery Works, North Abington, Mass., a Massachusetts trust
Continuation of application Ser. No. 216,856, Aug. 14, 1962. This application Mar. 18, 1965, Ser. No. 443,770
11 Claims. (Cl. 241—101)

This application is a continuation application of my copending application Ser. No. 216,856, filed Aug. 14, 1962, and now abandoned.

This invention relates to a novel, self-contained, hydraulic load cell for weighting and accurately measuring the degree of weighting applied to crushing or squeezing rolls, more particularly crushing rolls used to crush and remove trash and undesirable foreign materials from usable textile fibers.

Crushing rolls are now in common use to crush the undesirable elements existing in a carded web of textile fibers. The amount of crushing force applied to the nip of the rolls must be great enough to crush the undesirable elements in the carded web but should not be so great as to damage the usable fibers in the web. If too much force is applied to the rolls, the usable textile fibers will be exposed to a mutilation which reduces the length of the fibers.

The use of hydraulic fluid means to apply a crushing force to such rolls permits the utilization of a pressure gauge connected to the hydraulic fluid to determine the degree of crushing force applied to the rolls. However, when a hydraulic cylinder is employed, accurate crushing force readings cannot be determined from the pressure gauge reading because of the internal friction between the cylinder wall and the leather cup seals or "O" rings of the piston. This "break out" friction between these sliding elements results in a false pressure gauge reading used to determine the crushing force. Furthermore, there is a gradual weeping of pressurized hydraulic fluid by the piston seals over a period of time (the crushing force is maintained over a long period of time) and means must be provided to make up the loss of hydraulic fluid. To overcome this loss, the cylinder is connected to an outside pressure source or pump, or if the unit is self-contained, a take-up screw may be employed, the body of which displaces an amount of fluid equal to the weeping loss, the fluid pressure being maintained by periodically taking up on this displacement screw. Eventually, the loss of fluid in the self-contained type of unit must be replaced. Furthermore, leakage of hydraulic fluid onto the crushing rolls or web causes the web to stick to the rolls.

The use of a flat diaphragm or metal bellows to convert the hydraulic fluid pressure to a crushing force on the rolls eliminates this problem of weeping of fluid. Unfortunately, however, the diaphragm or bellows, when subject to a hydraulic pressure, will stretch and distort and consequently, its effective pressure area changes for various positions of its stroke. For a particular pressure gauge reading, it is not possible to determine the true crushing force applied on the crushing rolls because of this effective pressure area shift, unless the device is calibrated for its various diaphragm stroke positions. Such calibration is involved and impractical because the stretch of the diaphragm varies with the applied fluid pressure and causes a variation in stretch. True crushing load readings can only be calculated for a very limited range of stroke in which the effective pressure area shift of the diaphragm will be at its minimum.

The present invention overcomes the above-mentioned defects by employing a flexible, top hat-shaped rolling diaphragm with an annular 180° rolling convolution extending between the side wall of the piston and the wall of the cylinder. With this type of diaphragm, the downward movement of the piston causes the vertical wall of the convolution of the diaphragm to roll off the cylinder wall, through the 180° turn of the convolution and roll on to the vertical side of the piston. This rolling action is for all practical purposes frictionless. Since there is no sliding contact between the piston and the cylinder wall, there is no "break out" friction.

Another feature of this type of rolling diaphragm is the fact that the effective pressure area is constant and does not vary over the entire length of the piston stroke. The effective pressure area remains constant because there is no change in the width of the convolution or in the 180° angular turn of the convolution. A downward or upward movement of the piston will only change the relative vertical position of the 180° convolution to the piston or to the cylinder wall. It will not change the width of the convolution or its 180° angle.

Since the effective pressure area is constant and there is no "break out" friction, the force delivered to the crushing rolls is an exact function of the hydraulic fluid pressure indicated on the pressure gauge, regardless of the position of the piston in its stroke. The force transmitted to the rolls is also immediately in response to the internal hydraulic fluid pressure which is indicated by the pressure gauge and which is the result of the initial force applied vertically to the top of the piston.

Another feature of the load cell of the present invention is the hermetic sealing of the hydraulic fluid within the unit. There are no sliding mechanical seals as in the case of the cylinder and its sliding piston, through which there is a weep of oil. No adjustments are necessary to compensate for the loss of oil, the drop in pressure or the drop in force transmitted by the unit to the crushing rolls. No outside pressure source is required to replace the oil loss. Neither is there any need for an oil displacement screw or its adjustment to compensate for an oil weep.

The load cell of the present invention combines the good features of the cylinder and piston with the desired features of the diaphragm. Namely, the effective pressure area is constant through the entire length of the stroke as obtained with the cylinder and piston, and the pressurized hydraulic fluid can be hermetically sealed in a pressure chamber as is possible when a diaphragm is employed.

It omits the undesirable features of the cylinder and piston, namely, the weep of fluid by the piston packing, and the "break out" friction of the sliding piston seal. It also omits the undesirable features of the flat diaphragm or metal bellows, that is, the changes or shift in effective pressure area of the diaphragm for the various positions in its stroke and the limited amount of stroke available to reduce the error introduced by the effective pressure area shift.

Another object of the invention is to provide an improved hydraulic load cell unit for transmitting crushing force to crushing rolls, particularly crushing rolls used to remove impurities in textile webs, in which the crushing force can be accurately measured.

Other advantages and objects will be apparent from the following description and the accompanying drawings in which:

FIG. 2 is a front elevation of a side and the center portion of the device of FIG. 1, the other side being substantially the same as the side shown in the figure;

FIG. 3 is a section taken along the line 3—3 of FIG. 2;

FIG. 4 is a section taken along the line 4—4 of FIG. 2 showing in section the load cell;

FIG. 6 is a view in perspective of the diaphragm of FIG. 1 with a part removed to show the cross-sectional shape;

FIG. 7 is an enlarged view like FIG. 4 of the top portion of the load cell showing in full lines the piston and diaphragm in the topmost position of the piston and showing in dotted lines an exaggerated movement of the piston downwardly to demonstrate the rolling nature of the diaphragm.

Figure 1:
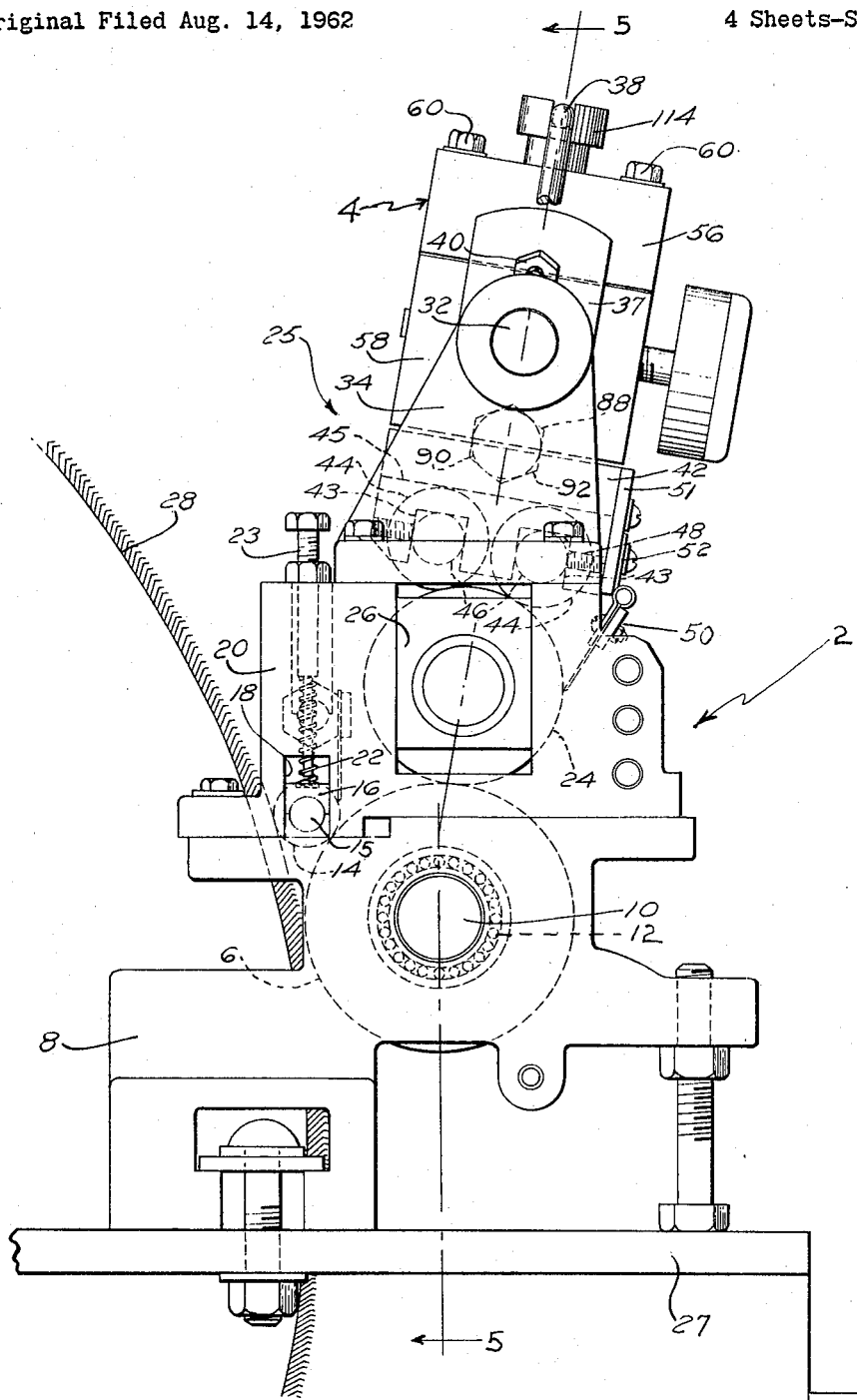
FIG. 1 is a left side elevation of a combined take-off and crushing roll device embodying crushing rolls for crushing impurities in a carded cotton web and also embodying an embodiment of the hydraulic load cell of the present invention through which crushing force is transmitted to the crushing rolls and by means by which such force can be accurately measured.
Figure 5:
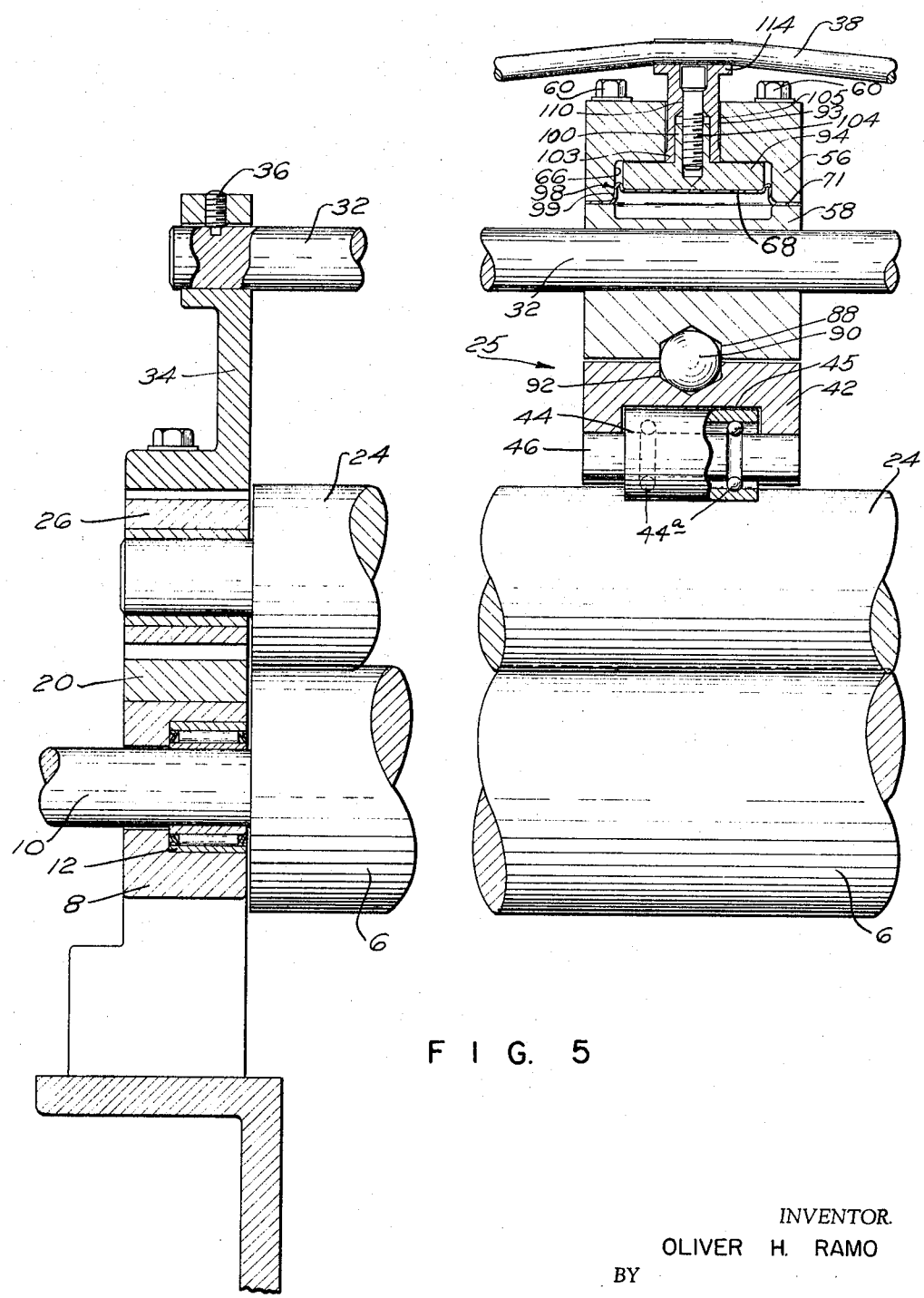
FIG. 5 is a longitudinal section taken along the line 5—5 of FIG. 1 showing in section the load cell and the manner in which the crushing rolls are rotatably mounted on the frame.

With reference to the drawings, 2 represents a combined doffer take-off and crushing roll assembly with an embodiment of the load cell 4 of the present invention installed therein.

The assembly comprises (1) a lower, smooth surfaced, metal combined take-off and crushing roll 6 (4″) rotatably journaled in a pair of lower support members 8 by means of reduced end shafts 10 and roller bearings 12 in the lower support members, (2) a smooth surfaced, metal, smaller (1″) take-off roll 14, rotatably mounted by means of reduced end shafts 15 in a pair of blocks 16 mounted for vertical sliding movement in vertical guides 18 in a pair of upper support members 20 secured on top of the lower support members 8, the roll 14 being urged downwardly toward and against roll 6 by springs 22 and screws 23 and (3) an upper, smooth surfaced, metal crushing roll 24 (3″) also rotatably mounted in the upper support members 20 by means of vertically slidable blocks 26 in which the roll 24 is journaled and which are mounted on the upper support members 20 for vertical sliding movement away from and toward the lower roll 6 whereby the upper crushing roll can be urged against the lower crushing roll by means of the crushing force exerting assembly 25 of which the load cell 4 is a part.

The lower support members are supported on the card frame 27 immediately after and on either side of the cotton card doffer 28 so that the peripheries of rolls 6 and 14 are closely adjacent the doffer periphery. Roll 6 is driven from the doffer and rolls 14 and 24 are driven from roll 6. A scraper blade (not shown) is provided for each roll to clean the roll.

The rolls 6 and 14 function to remove the web of fibers from the doffer 28 of a conventional cotton card and the rolls 6 and 24 crush the impurities in the removed web. Thus, the lower roll performs a take-off function and a crushing function.

The crushing force exerting assembly 25 comprises (1) a horizontally disposed force transmitting rod 32 mounted at its ends in holes in a pair of brackets 34, secured to the tops of upper support members 20, the ends of the rod 32 being secured in their brackets 34 by means of screws 36, which also prevent rotation of the rod 32, (2) a bendable, bowed tension rod 38 bowed at its middle and mounted at its ends to rod 32 by means of a pair of spaced brackets 37 which are mounted on, and pinned to, rod 32 adjacent the brackets 34 and which have oversize holes 39 through which the end portions of the tension rod 38 extend, such end portions being threaded to receive tightening nuts 40 which may be tightened or loosened to apply and relieve, respectively, a straightening force to the bowed tension rod, which force is transmitted to the crushing roll 24 through (3) load cell 4 mounted on rod 32 and (4) force applying member 42 having a pair of parallelly disposed rolls 44 rotatably mounted therein, which are urged into engagement with top crushing roll 24 to force such roll toward the lower roll 6.

The bottom surface of force applying member 42 has a pair of parallel, spaced channels 43 extending thereacross in a direction parallel to the roll 24 and a single, centrally disposed wider channel 45 extending thereacross in a direction perpendicular to and intersecting the first pair of channels, the two shafts 46, on which the two rollers 44 are rotatably mounted each by two axially spaced ball bearing assemblies 44a, being mounted in the two narrow channels and the two wider rolls 44 being accommodated by the wider cross channel, as shown. Circular grooves on the shafts 46 form the inner races for the ball bearings. The shafts 46 are held against rotation by screws 48 frictionally engaging the shafts 46. A protecting guard plate 50 extending below the member 42 in front of the nips between rolls 44 and roll 24 is hingedly mounted by means of hinge 52 to the plate 51 bolted to the front side of member 42 in front of the front end of channel 45, as shown, such plate being urged by spring 54 to the position shown in the drawings. This plate 50 is to guard against accidentally inserting the fingers between the rolls 44 and roll 24 and against crushed trash on the roll 24 passing to such nips.

The load cell 4 comprises two solid metal blocks 56 and 58 of square horizontal cross-section bolted together by four bolts 60 at the corners to form a single block. The mating surfaces of the blocks having mating cylindrical shaped recesses forming a cavity 62 of round horizontal cross-section divided into a lower hydraulic fluid cavity 64 and an upper piston receiving cavity 66 by a round rolling type diaphragm 68, to be described in greater detail hereinafter, the peripheral portion 71 of which is wedged in a liquid-tight manner between the peripheral portions of the lower and upper surfaces of the upper and lower blocks 56 and 58, respectively, to secure the diaphragm across the cavity 62 in a liquid tight manner, as shown.

The lower block 58 has a horizontal passage 69 extending therethrough parallel to the axis of the roll 24 and receiving the rod 32, as shown. Lower block 58 also has a pair of passages 70 therein leading from the floor of the hydraulic fluid cavity 64 to the front and rear surfaces 65 of the block 58, each passage comprising a vertical portion 72 and a wider horizontal portion 74, the ends of which are threaded at 76. A pressure gauge 80 is threaded in one of the passages 74, as shown, the passage 70 to which the gauge is attached providing communication between the hydraulic fluid chamber 64 and the gauge. The other passage 70 is plugged in a liquid tight manner by threaded plug 82. The ends of a pair of spaced threaded set screws 86, received in a pair of spaced threaded passages 84 in block 58 lying on each side of horizontal passage 74 in which the plug 82 is received, extend into slight recesses in the rod 32, as shown in FIG. 4, to secure the load cell to the rod 32 and prevent rotation of the load cell 4 around the rod due to the rotation of the upper crushing roll 24. Note that the horizontal portions 74 of passages 70 are coaxial, the center-lines of the axes thereof intersecting the center axis of the horizontal passage 69 and rod 32 received therein. Thus, the load cell 4 is mounted on the central portion of rod 32 by means of passage 69.

The lower surface of block 58 has a ball socket 88 which receives the upper part of a force transmitting ball 90, the lower part of the ball 90 being received in the ball socket 92 in the upper surface of member 42. Crushing force is transmitted from the load cell to the member 42 through this ball. However, it and the ball sockets can be eliminated and the load cell 4 rigidly secured to the top of member 42 with the lower surface of the load cell in abutting relation with the upper surface of the member 42. In such case, set screws 86 can be omitted and hole 69 can be elongated vertically to allow the load cell to freely move vertically with respect to rod 32. With the use of a ball 90, the dimensions of the ball and sockets 88 and 92 are such that the lower surface of the load cell is spaced slightly above the upper surface of the member 42 to permit universal movement between the load cell and member 42.

The lower hydraulic fluid cavity 64 below the diaphragm 68 and the passages 70 are full of hydraulic fluid, as shown, such cavity and the passages 70 being hermetically sealed and hence liquid tight except for communication with gauge 80. Since the pressure gauge 80 is in communication with the hydraulic fluid cavity, hydraulic fluid pressure in the cavity 64 is registered by the gauge.

A cylindrical-shaped vertical passage 93 extends from the center portion of the top wall of cylindrical-shaped piston cavity 66 to the center portion of the top wall of upper block 56.

Horizontally disposed within the piston cavity 66 is a cylindrical piston 94, the lower flat surface of which lies flat on the top of the middle sunken crown portion of diaphragm 68. The diameter of the piston is less than the diameter of cavity 66 to form an annular space 96 in which is received the annular 180° upwardly extending convolution of fold 98 of the rolling diaphragm 68, consisting of two parallel vertical walls 97 and 99 joined by rounded fold 101, the action of which will be described in greater detail hereinafter. The inner vertical wall 97 of the convolution lies against and along the side of the piston and the outer vertical wall 99 of the convolution lies against and along the side wall of cavity 66. Piston 94 has a central shank 100 extending upwardly into passage 93 to which is secured a piston rod 102 by means of threaded bolt 104, threaded in a vertical threaded passage 106 in shank 100. Piston rod 102 is slidably received in passage 93. Except for the enlarged lower portion 103, the portion of the piston rod 102 received within passage 93 is sufficiently smaller in diameter than the passage 93 to provide a slight space 105 therebetween. The fit between enlarged portion 103 and the passage 93 is snug but slidable. This arrangement prevents undue friction from side thrusts due to unequal take-up of tension rod 38. Piston rod 102 has a central passage extending therethrough comprising an upper portion 108, a reduced middle portion 110, and a lower enlarged portion 112 in which is snugly received the shank 100 of the piston 106, as shown. The middle portion 110 of the passage snugly receives the shank of bolt 104 and the upper portion 108 receives the head of the bolt, such head engaging the shoulder formed by the juncture of 108 and 110. The piston rod 102 extends upwardly a substantial distance above the top surface of the block 56 and the enlarged upper portion 114 thereof has a horizontal groove 116 extending thereacross above the passage 108 in a direction parallel to the roller 24, such groove receiving the bowed, middle portion of tension rod 38.

The diaphragm 68 prevents any hydraulic fluid from entering the piston cavity.

Tightening of the nuts 40 on the tension rod 38 tends to straighten the tension rod against the piston rod 114 of the load cell, thereby exerting a downward crushing force on the piston rod. Such force is transmitted to the hydraulic fluid in cavity 64 through piston 94 and diaphragm 68. Such force is transmitted through the hydraulic fluid to the lower block 58 and thence, through the ball 90 and member 42 and rollers 44, to the upper crushing roll 24 to thereby urge it toward the lower roll 6 to crush impurities in the web passing between rolls 24 and 6. The mechanical force applied to the hydraulic fluid by the piston is converted into hydraulic pressure in the fluid which is accurately measured by the gauge 80. Thus, the crushing force is accurately measured by the gauge so that the exact force desired can be accurately set and reset to crush the impurities but not injure the particular fibers being processed. Operators can check the pressure at a glance and can reset the pressure value while the machine is running or when changing grades of fibers.

The rolling diaphragm seal 68 is sold by Bellofram Corporation, Burlington, Mass., and is described on pages 1 to 6 of the Jan. 19, 1961, issue of "Machine Design." It is sold under the name Bellofram Rolling Diaphragm and is made of a flexible rubberized fabric. Such diaphragm provides a seal preventing loss of hydraulic fluid by leakage. Diaphragm 68 has the general shape of a top hat with the middle portion of the crown thereof caved or sunken in or recessed where the bottom of the piston rests on it to thereby provide the annular convolution or pleat 98 located between the cylindrical side of the piston and the vertical wall of the cylindrical cavity 66.

FIG. 7 demonstrates the operation of the diaphragm. Note that on downward movement of the piston from its topmost position shown in full lines, the convolution 98 of the flexible diaphragm rolls down away from the side wall of the cavity 66 (cylinder) and onto (up with respect to the piston) the side wall of the downwardly moving piston, i.e. it rolls from the cylinder wall to the piston wall without sliding friction and does not scuff along the wall as is the case with O rings and leather cup seals. Because of the fact there is no break-out friction or stretching to overcome, the force applied to the upper roller 24 is very responsive to changes in force applied to the load cell. Thus, the force may be set at the exact required value not just an approximation of it as in the case of flat diaphragms or conventional bellows. The piston movement shown in FIG. 7 is greatly exaggerated to demonstrate the rolling operation of the diaphragm. Actually, only very slight movement occurs, e.g. 0.036" over a range of 0 to 200 lbs. per square inch pressure.

Another advantage of such a diaphragm is that its effective working area is constant to within 0.1% throughout the length of the stroke. Because of this feature, the force delivered to the rollers 44 is always an exact function of the indicated pressure, regardless of the pressure magnitude or the position of the piston. This is not true with flat diaphragms or bellows.

The diaphragm has extremely long flex life and is compatible with the hydraulic fluid. Although only 0.020" thick it can withstand pressures up to 1450 lbs. per square inch (bursting point), which is far beyond any pressure used for crushing textile webs. It is noted that this diaphragm functions as a pressure diaphragm only at the convolution, the rest being backed by the piston.

The above description and accompanying drawings are for the purpose of illustration only and it is not intended that the invention be limited thereto or thereby, such invention being defined by the following claims and including all equivalents thereof.

I claim:

1. A self contained hydraulic pressure transmitting load cell comprising a block having an internal cavity, a top hat-shaped rolling flexible diaphragm separating said cavity into a hydraulic fluid containing chamber and a piston chamber, a pressure gauge, a passage in said block providing communication between said hydraulic fluid chamber and said gauge, said hydraulic fluid chamber being hermetically sealed except for said communication with said gauge and containing hydraulic fluid, a piston within said piston chamber and supported on said diaphragm, a vertical bore extending from the top of said block to said piston chamber, said bore receiving a piston rod attached to said piston for applying a load to said block through said diaphragm and hydraulic fluid, bearing means at the bottom of said block for transmitting said load to a working member, said gauge indicating the magnitude of said load applied to said working member, said diaphragm having an annular 180° rolling convolution, which is rolled by movement of said piston.

2. A load cell according to claim 1, said block being mounted on a rod extending through a transverse passage through said block.

3. A load cell according to claim 1, said bearing means comprising bearing means for transmitting said load to a rotating roll.

4. A load cell according to claim 1, the side of said piston bing spaced from the side wall of the piston chamber to form an annular space therebetween, said diaphragm having an annular 180° convolution extending into said space between and along the side of the piston and the wall of the piston chamber.

5. A load cell according to claim 4, the shape of said diaphragm being that of a top hat with the center portion of the crown being recessed to form said annular convolution, said convolution being defined by the vertical wall of the recess and the parallel side wall of the crown, the juncture thereof forming a 180° fold.

6. A load cell according to claim 1, said bearing means comprising a pair of rotatable rolls.

7. A load cell according to claim 5, said block being formed by a pair of blocks, the opposed faces of which are provided with opposing recesses forming said cavity, the peripheral portion of said diaphragm being clamped between said blocks so as to be positioned across said cavity to divide it into said hermetically sealed hydraulic fluid chamber and said piston chamber.

8. In combination, a pair of textile fiber web crushing rolls, means for exerting a crushing force on one of said rolls to force it toward the other to provide a crushing function, said force exerting means comprising a self contained hydraulic pressure transmitting load cell comprising a block having an internal cavity, a top hat-shaped rolling flexible diaphragm separating said cavity into a hydraulic fluid containing chamber and a piston chamber, a pressure gauge, a passage in said block providing communication between said hydraulic fluid chamber and said gauge, said hydraulic fluid chamber being hermetically sealed except for said communication with said gauge and containing hydraulic fluid, a piston slidable within said piston chamber and supported on said diaphragm, a vertical bore extending from the top of said block to said piston chamber, said bore slidably receiving a piston rod attached to said piston, means for asserting a mechanical force on one of said block and said piston, whereby said force is transmitted through said hydraulic fluid to the other of said block and piston, and means for transmitting said force from said other of said piston and block to said one roll.

9. A combination according to claim 8, the side of said piston being spaced from the side wall of the piston chamber to form an annular space therebetween, said diaphragm having an annular 180° convolution extending upwardly therefrom into said annular space between the piston and the wall of the piston chamber.

10. A combination according to claim 9, the shape of said diaphragm being that of a top hat with the center portion of the crown being recessed to form said annular convolution, said convolution being defined by the vertical wall of the recess and the parallel side wall of the crown, the juncture thereof forming a 180° fold.

11. A self contained hydraulic pressure transmitting load cell comprising a block having an internal cavity, a top hat-shaped rolling flexible diaphragm separating said cavity into a hydraulic fluid containing chamber and a piston chamber, a pressure gauge, a passage in said block providing communication between said hydraulic fluid chamber and said gauge, said hydraulic fluid chamber being hermetically sealed except for said communication with said gauge and containing hydraulic fluid, a piston within said piston chamber and supported on said diaphragm, a vertical bore extending from the top of said block to said piston chamber, said bore receiving a piston rod attached to said piston for applying a load to said block through said diaphragm and hydraulic fluid, bearing means at the bottom of said block for transmitting said load to a working member, said gauge indicating the magnitude of said load applied to said working member.

References Cited by the Examiner
UNITED STATES PATENTS

| | | | |
|---|---|---|---|
| 2,075,156 | 3/1937 | Albero | 241—167 |
| 2,563,690 | 7/1951 | Nalon | 308—9 |
| 2,669,866 | 2/1954 | Holmes. | |
| 2,911,606 | 11/1959 | Hoffman | 73—406 X |

ROBERT C. RIORDON, *Primary Examiner.*

D. G. KELLY, *Assistant Examiner.*